US010668923B2

(12) United States Patent
Breuer et al.

(10) Patent No.: US 10,668,923 B2
(45) Date of Patent: Jun. 2, 2020

(54) METHOD FOR ADAPTIVELY CONTROLLING A VEHICLE SPEED IN A VEHICLE, AND SPEED CONTROL SYSTEM FOR CARRYING OUT THE METHOD

(71) Applicant: WABCO GmbH, Hannover (DE)

(72) Inventors: Karsten Breuer, Oberreute (DE); Ahmed Ragab, Hannover (DE)

(73) Assignee: WABCO GMBH, Hannover (DE)

( * ) Notice: Subject to any disclaimer, the term of this patent is extended or adjusted under 35 U.S.C. 154(b) by 155 days.

(21) Appl. No.: 16/060,034

(22) PCT Filed: Nov. 14, 2016

(86) PCT No.: PCT/EP2016/001894
§ 371 (c)(1),
(2) Date: Jun. 7, 2018

(87) PCT Pub. No.: WO2017/097392
PCT Pub. Date: Jun. 15, 2017

(65) Prior Publication Data
US 2018/0362039 A1 Dec. 20, 2018

(30) Foreign Application Priority Data
Dec. 9, 2015 (DE) .......................... 10 2015 015 923

(51) Int. Cl.
*B60W 30/14* (2006.01)
*B60W 10/06* (2006.01)
(Continued)

(52) U.S. Cl.
CPC ............. *B60W 30/143* (2013.01); *B60T 8/32* (2013.01); *B60T 8/323* (2013.01); *B60W 10/06* (2013.01);
(Continued)

(58) Field of Classification Search
CPC .. B60W 30/143; B60W 10/06; B60W 10/184; B60W 2510/0657;
(Continued)

(56) References Cited

U.S. PATENT DOCUMENTS 8,386,091 B2    2/2013 Kristinsson et al.
2004/0068359 A1* 4/2004 Neiss ................. B60K 31/0058
                                                              701/96
(Continued)

FOREIGN PATENT DOCUMENTS

DE    102009022170 A1    1/2010
DE    102008039950 B4    3/2010
(Continued)

*Primary Examiner* — Aaron L Troost
(74) *Attorney, Agent, or Firm* — Leydig, Voit & Mayer, Ltd.

(57) ABSTRACT

A method for adaptively controlling a vehicle speed in a vehicle includes establishing a reference speed; and activating an engine and/or brakes and/or a transmission of the vehicle by a speed-control system as a function of a set vehicle speed and/or a set vehicle retardation for fuel-saving adaptation of the currently existing vehicle speed to the reference speed. The set vehicle speed and/or the set vehicle retardation for a current driving-dynamics situation of the vehicle defined by driving-dynamics vehicle parameters is/are determined as a function of at least one computation coefficient. The at least one computation coefficient is provided by an external arithmetic unit outside the vehicle as a function of the currently existing driving-dynamics vehicle parameters and also as a function of currently existing route information for a route segment situated ahead. The route segment situated ahead is established on the basis of the currently existing driving-dynamics vehicle parameters.

16 Claims, 4 Drawing Sheets

(51) Int. Cl.
*B60W 10/184* (2012.01)
*B60T 8/32* (2006.01)
*G01C 21/34* (2006.01)

(52) U.S. Cl.
CPC ....... *B60W 10/184* (2013.01); *G01C 21/3469* (2013.01); *B60T 2201/02* (2013.01); *B60T 2210/36* (2013.01); *B60T 2260/08* (2013.01); *B60W 2510/0657* (2013.01); *B60W 2510/18* (2013.01); *B60W 2520/10* (2013.01); *B60W 2520/28* (2013.01); *B60W 2530/10* (2013.01); *B60W 2550/142* (2013.01); *B60W 2550/146* (2013.01); *B60W 2550/22* (2013.01); *B60W 2710/06* (2013.01); *B60W 2710/18* (2013.01); *B60W 2750/40* (2013.01)

(58) Field of Classification Search
CPC ......... B60W 2510/18; B60W 2520/10; B60W 2520/28; B60W 2530/10; B60W 2550/142; B60W 2550/146; B60W 2550/22; B60W 2710/06; B60W 2710/18; B60W 2750/40; B60T 8/32; B60T 8/323; B60T 2201/02; B60T 2210/36; B60T 2260/08; G01C 21/3469
See application file for complete search history.

(56) References Cited

U.S. PATENT DOCUMENTS

| | | | |
|---|---|---|---|
| 2009/0048748 A1* | 2/2009 | Zhao | ................... B60W 10/04 701/59 |
| 2012/0283928 A1 | 11/2012 | Bjernetun et al. | |
| 2014/0277835 A1 | 9/2014 | Filev et al. | |
| 2014/0277971 A1 | 9/2014 | Oshiro et al. | |

FOREIGN PATENT DOCUMENTS

| | | |
|---|---|---|
| DE | 102012214827 A1 | 2/2014 |
| DE | 102014204206 A1 | 9/2014 |
| EP | 1288056 A2 | 3/2003 |
| WO | WO 2013191614 A1 | 12/2013 |

\* cited by examiner

METHOD FOR ADAPTIVELY CONTROLLING A VEHICLE SPEED IN A VEHICLE, AND SPEED CONTROL SYSTEM FOR CARRYING OUT THE METHOD

CROSS REFERENCE TO RELATED APPLICATIONS

This application is a U.S. National Stage Application under 35 U.S.C. § 371 of International Application No. PCT/EP2016/001894 filed on Nov. 14, 2016, and claims benefit to German Patent Application No. DE 10 2015 015 923.2 filed on Dec. 9, 2015. The International Application was published in German on Jun. 15, 2017 as WO 2017/097392 A1 under PCT Article 21(2).

FIELD

The invention relates to a method for adaptively controlling a vehicle speed in a vehicle, in particular a utility vehicle with a speed-control system, and also to a speed-control system for carrying out the method.

BACKGROUND

In vehicles, particularly utility vehicles, closed-loop controls for a vehicle speed are known as speed-control system or alternatively as cruise control. These adjust the current vehicle speed to a reference speed which has been preset by the driver, without an actuation of the brake pedal being necessary. Systems of such a type can be expanded by an adaptive closed-loop control which additionally controls the vehicle speed by looking ahead and thereby presets a fuel-saving mode of driving for the purpose of attaining the reference speed. For the purpose of fuel-saving adaptive control, route information, in particular a topography of a route segment situated ahead, is taken into consideration for instance. A system of such a type is, for instance, known as a Predictive Powertrain Control (PPC) system.

In DE 10 2014 204 206 A1 a travel-path navigation with optimal speed profile is provided, wherein for a predefined distance from a first position of the vehicle as far as a destination an optimal vehicle speed is computed with the aid of dynamic programming. Consequently, for instance, at the start of a journey an optimal speed profile is drawn up which specifies the set vehicle speeds for respective places on the predefined route, so that the route can be followed with an optimized energy consumption. The speed profile in this connection is ascertained outside the vehicle, so that computationally intensive arithmetical operations are not executed in the vehicle.

US 2014/0277971 A1 likewise presents a method for computing a speed profile between a preset start-position and an end-position, wherein a route to be traveled between the start-position and the end-position is determined or preset. For this route to be traveled an optimal speed profile is drawn up, wherein route information—for instance, an uphill grade, speed limits, traffic jams, or similar—is taken into consideration. The computations in this connection are, for instance, executed and stored in advance on a computer or in a cloud, so that the speed profile ascertained in advance for the entire route can be used during the journey for the purpose of controlling the vehicle speed.

U.S. Pat. No. 8,386,091 B1 presents a comparable method for computing a speed profile, wherein the computation takes place outside the vehicle on a cloud-based computer. To this end, firstly a route to be traveled is preset by the driver, and for this route a fuel-saving speed profile is determined on the basis of route information.

A disadvantageous aspect in this connection is that the entire route to be traveled is computed, and consequently a lot of computation effort and computation time are necessary in order to determine the speed profile of the predefined route. In addition, the computation is based on current values prior to the start of the journey, so that in the case of an event during the journey, for instance a newly arisen or a dispersed traffic jam or an unintentional loading or unloading of the vehicle, the computed speed profile becomes imprecise.

In DE 10 2008 039 950 B4, moreover, a method is presented for ascertaining a driving profile. In this connection, a travel route that is to be followed is established, and the current position of the vehicle is ascertained. For the travel route or a part of the travel route, a speed profile is ascertained in a model, in particular as a function of a topography as well as properties of a drive device, for instance an acceleration potential, in order to obtain an optimization of consumption. Moreover, an acceleration at a distance ahead of the vehicle can be computed, in order to be able to overcome an uphill grade, for instance, in fuel-saving manner.

US 2012/0283928 A relates to a method for controlling an overspeed and an underspeed of a vehicle with a speed-control system during a downhill grade or an uphill grade. In this case, the vehicle speed and a vehicle mass are ascertained, and the brakes and the drive unit are set in such a manner that an overspeed or an underspeed can be minimized.

DE 10 2009 022 170 A1 relates to a method for limiting the vehicle speed as a function of a centripetal force acting on the vehicle. To this end, a curve situated within the capture range is detected by a capture unit, and for the capture range a centripetal force acting on the vehicle is determined, in particular as a function of a vehicle mass and as a function of the vehicle speed. If said force is too great, the vehicle speed is reduced.

In DE 10 2012 214 827 A1 a method is described in which the vehicle is controlled as a function of a loading parameter and as a function of route information which is determined in advance for a road section to be driven though.

SUMMARY

In an embodiment, the present invention provides a method for adaptively controlling a vehicle speed in a vehicle. The method includes establishing a reference speed; and activating an engine and/or brakes and/or a transmission of the vehicle by a speed-control system as a function of a set vehicle speed and/or a set vehicle retardation for fuel-saving adaptation of the currently existing vehicle speed to the reference speed. The set vehicle speed and/or the set vehicle retardation for a current driving-dynamics situation of the vehicle defined by driving-dynamics vehicle parameters is/are determined as a function of at least one computation coefficient. The at least one computation coefficient is provided by an external arithmetic unit outside the vehicle as a function of the currently existing driving-dynamics vehicle parameters and also as a function of currently existing route information for a route segment situated ahead. The route segment situated ahead is established on the basis of the currently existing driving-dynamics vehicle parameters.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
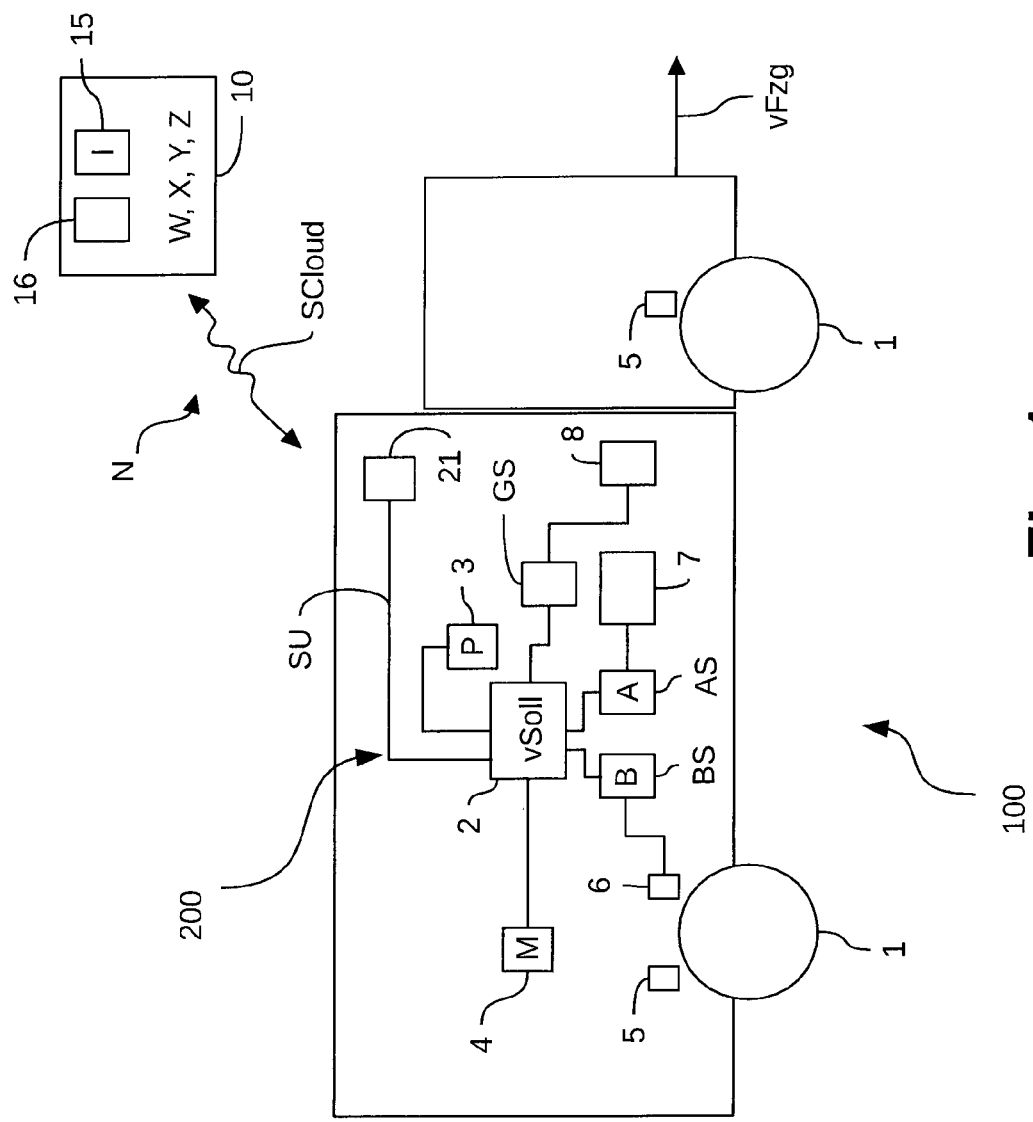
FIG. 1 shows a vehicle with an electronically controlled pneumatic braking system as a block diagram.

Embodiments of the invention provide methods for an adaptive control of a vehicle speed, with which a fuel-saving mode of driving can be reliably obtained, wherein, in particular, the computation time and the computation effort are to be reduced in order to enable a fast and cost-effective processing of data in the vehicle. Moreover, embodiments of the invention provide a speed-control systems for carrying out such methods.

In accordance with embodiments of the invention, there is therefore provision to adapt a current vehicle speed of a vehicle to a reference speed which has been preset by the driver, wherein, to this end, elaborate arithmetical operations are swapped out to an external arithmetic unit, preferentially a cloud. In this connection, at least one computation coefficient is drawn upon which is derived in the external arithmetic unit as a function of driving-dynamics vehicle parameters and also as a function of current route information. With the at least one computation coefficient, a set vehicle speed and/or a set vehicle retardation can be determined, for instance in a control unit of a speed-control system according to an embodiment of the invention, with which the currently existing vehicle speed is adapted in order to attain the reference speed, in which connection a fuel-saving mode of driving is striven for. The set vehicle retardation in this connection may be positive or negative, this being obtained, for instance, by a drive unit of the vehicle being activated with a corresponding drive torque, or by braking systems of the vehicle being activated with corresponding braking torques, so that the vehicle speed is increased (set vehicle retardation positive) or reduced (set vehicle retardation negative).

This already results in the advantage that no stringent demands need to be made of the capability of the control unit in the speed-control system in the vehicle, since elaborate arithmetical operations—that is to say, in particular, the determination of the at least one computation coefficient—for determining the set vehicle speed and/or the set vehicle retardation are swapped out to the external arithmetic unit. In this connection the external arithmetic unit can be accessed wirelessly via a network, for instance via a radio link, in particular a mobile-radio link, for instance to the Internet, and the infrastructure of the external arithmetic unit permits elaborate arithmetical operations, for example simulations, to be carried out in parallel with one another, in the course of which the external arithmetic unit, which for instance operates in the manner of cloud computing, can be accessed by all vehicles with an adaptive control system according to embodiments of the invention. Establishing such a powerful infrastructure outside the vehicle is substantially simpler and more cost-saving, since a cost-intensive arithmetic unit does not have to be installed, maintained and updated in each vehicle.

By way of driving-dynamics vehicle parameters, a current position of the vehicle, a current vehicle mass, a current vehicle speed, a currently maximally available drive torque and/or a currently maximally available braking torque are understood, for instance, by which a currently existing driving-dynamics situation of the vehicle can be defined—that is to say, for example, how quickly the vehicle can be decelerated or accelerated at the current position, starting from the current vehicle speed.

This already has the advantage that currently existing vehicle parameters are taken into consideration for the adaptive control of the vehicle speed, so that for the current position, also in the case of a change of the vehicle mass, for instance after an interim loading or unloading, or after a deviation of the vehicle speed from the planned speed profile, a reliable adaptation of the vehicle speed for the purpose of obtaining a fuel-saving mode of driving is made possible. To this end, the vehicle parameters are determined in the vehicle and are continually, for instance also as a function of the vehicle speed, communicated to the external arithmetic unit, so that the at least one computation coefficient can be ascertained on the basis of the current driving-dynamics vehicle parameters.

In accordance with embodiments of the invention, in the course of ascertaining the at least one computation coefficient currently existing route information in a route segment situated ahead of the position of the vehicle is taken into consideration, which has been stored, for instance, in a map system in the external arithmetic unit. Route information is understood as meaning, for instance, a topography—that is to say, an uphill grade, a downhill grade or a curve—but also speed limits or traffic information—such as, for example, a traffic jam, stop-starting/slow-moving traffic or traffic located ahead of intersections, traffic lights or such like, and/or where appropriate taking the switching phases of the traffic lights into consideration.

Consequently, the topography at the current position and in the route segment situated ahead in front of the vehicle, or a traffic jam situated ahead, can also be included in the ascertainment of the at least one computation coefficient in the external arithmetic unit. Advantageously, this route information can be kept up to date, by the external arithmetic unit or the map system being updated in the case of changes in the current route information. As a result, computation effort and storage capacity in the vehicle can additionally be spared, because it is not necessary to update the control unit of the vehicle and to store current topographies, but merely in the external arithmetic unit. Since the external arithmetic unit can be accessed by all vehicles with an adaptive control system according to embodiments of the invention, the current route information merely has to be updated at a central point, as a result of which updating effort can be spared. Consequently the computation coefficients are also continually kept up to date, so that a fuel-saving driving behavior can be retained also in the case of currently arising events, in particular current traffic information such as, for example, a new traffic jam.

Preferentially, an algorithm for deriving the at least one computation coefficient is provided in the external arithmetic unit, said algorithm predetermining the at least one computation coefficient, in particular for certain positions in the map system. To this end, simulations for various set vehicle speeds and/or set vehicle retardations, for instance at the individual positions in the map system, can be carried out by the algorithm as a function of differing values for the driving-dynamics vehicle parameters and also of differing values for the route segment situated ahead, and from the simulations the computation coefficient having the least fuel consumption for the corresponding position can be derived. This computation coefficient is then stored together with the corresponding values of the driving-dynamics vehicle parameters and with the value for the route segment in the map system for the corresponding position.

If a vehicle traveling at a corresponding position communicates driving-dynamics vehicle parameters to the external arithmetic unit, the external arithmetic unit can then send the computation coefficients for these driving-dynamics vehicle parameters, which have been stored for this position or ascertained with the newly communicated driving-dynamics vehicle parameters, back to the control unit of the speed-control system in this vehicle, which then by simple arithmetical operations computes the set vehicle speed and/or the set vehicle retardation and activates an engine and/or brakes and/or a transmission of the vehicle, in order to adapt the current vehicle speed to the set vehicle speed in corresponding manner.

For the purpose of computing the set vehicle speed, in the speed-control system the currently maximally available braking torque, for instance, is then weighted with a first computation coefficient, the current vehicle mass is weighted with a second computation coefficient, and/or the currently maximally available drive torque is weighted with a third computation coefficient, so that in the control unit only a simple arithmetical operation, for instance a multiplication of the individual factors, takes place. Additionally, by virtue of a fourth computation factor a speed limit or further route information can be taken into consideration, for instance additively. Alternatively, merely individual computation coefficients for computing the set vehicle speed may also be drawn upon, for instance if a certain vehicle parameter is not available in the vehicle.

For the purpose of computing the set vehicle retardation, in the speed-control system a weighting of the maximally available braking torque and/or of the maximally available drive torque and/or of the vehicle mass, for instance, can likewise take place with the correspondingly communicated computation coefficients which were ascertained in the external arithmetic unit, so that merely simple arithmetical operations need to be carried out in the control unit in the vehicle.

Alternatively, the computation coefficients can also be derived by the algorithm on the basis of empirical values. If, for instance, a vehicle that has access to the external arithmetic unit is traveling along a route segment at a fuel-saving vehicle speed, the driving-dynamics vehicle parameters of this vehicle together with the computation coefficients corresponding to the fuel-saving vehicle speed can be ascertained by the algorithm and stored for the corresponding positions in the map system. Consequently a vehicle having similar driving-dynamics vehicle parameters can likewise draw upon these computation coefficients.

Consequently a separation of simple arithmetical operations, for instance simple multiplications or additions, and elaborate arithmetical operations, for instance simulations, takes place, in which connection simple arithmetical operations can be carried out in the control unit of the vehicle, and elaborate arithmetical operations are swapped out to the external arithmetic unit having a powerful infrastructure. Alternatively, all the arithmetical operations can be swapped out to the external arithmetic unit. In order that no unnecessary computation effort is transferred to the external arithmetic unit, the simple arithmetical operations, which can also be carried out in the vehicle, are advantageously transferred to the control unit in the respective vehicle.

In order to ease the burden on the external arithmetic unit further, in accordance with embodiments of the invention there is provision to cause the set vehicle speed and/or the set vehicle retardation, or the computation coefficients, to be determined by the algorithm merely for a certain route segment situated ahead, the route segment situated ahead being ascertained, in particular, as a function of a currently existing kinetic energy of the vehicle, which results from the current vehicle mass and the current vehicle speed.

As a result, it can advantageously be taken into consideration that a vehicle having a higher kinetic energy—that is to say, having a higher vehicle mass and/or a higher vehicle speed—has, for instance, a longer braking distance or a longer acceleration distance, and consequently a longer route segment situated ahead needs to be taken into consideration for fuel-saving computation of the set vehicle speed and/or of the set vehicle retardation. In the case of a lighter vehicle, on the other hand, a shorter route segment situated ahead is relevant, since the vehicle has a lower kinetic energy at the same vehicle speed and consequently can be decelerated or accelerated more quickly.

Advantageously, as a result the computation in the external arithmetic unit can be made more efficient by the algorithm, since in the course of computing the set vehicle speed and/or the set vehicle retardation the algorithm merely uses route information that is actually needed. Consequently a reliable adaptive control of the vehicle speed can take place, in the course of which the computation effort and the computation time are optimized. In addition, in the external arithmetic unit no unnecessary data are transferred and processed, since only the data that are also relevant are provided, so that the amount of data to be processed is limited, and consequently resources can be spared overall.

Advantageously, the driving-dynamics vehicle parameters, maximally available drive torque and maximally available braking torque can also be taken into consideration in the course of establishing the route segment situated ahead. As a result, a route-segment start-point of the route segment situated ahead of the vehicle can, for instance, be established which takes into consideration how quickly the vehicle can react to a change in the vehicle speed—that is to say, how quickly a deceleration and an acceleration are possible. This also has consequences on a route-segment end-point, up to which the route segment situated ahead extends from the route-segment start-point. This is because a vehicle having a high kinetic energy and a low maximally available braking torque or drive torque has a longer braking distance or acceleration distance than a vehicle having the same kinetic energy but higher maximally available braking torque or drive torque.

Consequently, on the basis of the driving-dynamics vehicle parameters a route segment can be ascertained, for which, with slight computation effort and optimal computation time, a reliable fuel-saving closed-loop control of the vehicle speed can be obtained. By currently existing vehicle parameters being drawn upon, the route segment can, in addition, be adapted very precisely to the driving dynamics actually existing, in order consequently also to be able to react reliably to route information situated ahead, for instance a newly arisen traffic jam or a speed limit.

The route segment situated ahead may in this connection, moreover, be dependent on a travel route which has been preset by the driver, so that not every conceivable route segment is considered, but merely route segments on the planned travel route. This can advantageously likewise be taken into consideration by the external arithmetic unit in the course of providing the computation coefficients, by merely computation coefficients for a certain route segment situated on the travel route being output.

In the course of determining the computation coefficients for the route segment situated ahead, a change of the vehicle speed can also be established indirectly—that is to say, starting from when an event situated ahead is relevant for the vehicle as a function of the driving-dynamics parameters. If, for instance, there is a speed limit on an uphill grade after a downhill grade, a deceleration of the vehicle and consequently a change of the vehicle speed, or of the computation coefficients, will occur otherwise than in the case of a speed limit on an uphill grade after a flat or gently ascending roadway. So in accordance with embodiments of the invention it can likewise be controlled as a function of the route information how quickly the set vehicle speed is to be attained, starting from the currently existing vehicle speed, this likewise being taken into consideration by the algorithm.

In the course of activating the brakes and/or the engine and/or the transmission for the purpose of fuel-saving implementation of the set vehicle speed and/or of the set vehicle retardation, moreover an upper and a lower limiting speed can be taken into consideration which, for instance, can be preset by the driver or alternatively established automatically. As a result, the speed limits within which the vehicle speed is to be adjusted can advantageously be set. By way of upper limiting speed, for instance a maximum speed of the vehicle can be preset by the driver, or a speed limit can be preset automatically by the external arithmetic unit. The lower limiting speed can be established in a manner depending on the upper limiting speed or on the configuration of the vehicle and also on a minimum speed which, for instance, has been determined by a journey time or by a route segment of the journey, such as, for example, a segment of a freeway having a minimum speed or recommended speed, within which the driver would like to reach his/her destination.

In particular, the upper and the lower limiting speed can also be taken into consideration by the algorithm, so that these likewise play a role in the ascertainment of the computation coefficients, in order also to be able to preset, as a function thereof, a fuel-saving set vehicle speed and/or set vehicle retardation.

The embodiment according to FIG. 1 relates to a vehicle 100, for instance a utility vehicle, with a control unit 2 according to an embodiment of the invention for adaptively controlling a vehicle speed vFzg, which is part of a speed-control system 200, also known as cruise control. In this connection the control unit 2 is connected to a position-determining system 3, for instance a Global Positioning System (GPS) which communicates a current position P of the vehicle 100 to the control unit 2. Moreover, a current vehicle mass M of the vehicle 100 has been saved in the control unit 2. In this connection the vehicle mass M may be either ascertained and stored in advance or alternatively ascertained continually by a mass-determining system 4, for instance an axle-load sensor or an electronic air-suspension system, and communicated to the control unit 2, in order to be able to ascertain a current vehicle mass M, for instance in the case of a change of the loading of the vehicle 100.

In addition, a currently maximally available drive torque A and also a currently maximally available braking torque B of the vehicle 100 have been saved in the control unit 2, which can be output from the drive control unit AS or brake control unit BS to the control unit 2 and which specify with which drive torque A or with which braking torque B the vehicle 100 can be maximally positively accelerated or maximally decelerated. With the aid of these, a driving-dynamics behavior of the vehicle 100 can be estimated, or a driving-dynamics situation can be defined. In addition, the current vehicle speed vFzg of the vehicle 100 is captured, for instance by wheel-speed sensors 5 arranged on wheels 1 of the vehicle 100. Alternatively, the current vehicle speed vFzg can also be derived from the change of the positions P ascertained by the position-determining system 3 or from the sensor signals SU of at least one vehicle-surround-field sensor 21, such as, for example, a radar/LIDAR sensor or a camera, to the speed-control system 200, in particular to the control unit 2.

The vehicle speed vFzg is adaptively controlled in the speed-control system 200. To this end, firstly a set vehicle speed vSoll and/or a set vehicle retardation zSoll is/are computed by the control unit 2. Subsequently, via the brake control unit BS, brakes 6 and/or, via the drive control unit AS, an engine 7 and/or, via a transmission controller GS, a transmission 8 of the vehicle 100 is/are activated in such a manner that the vehicle speed vFzg assimilates to the set vehicle speed vSoll, where appropriate with the preset set vehicle retardation zSoll. The adaptive control of the vehicle speed vFzg operates in this connection in the manner of a speed-control system 200 which by activation of the brakes 6 and/or of the engine 7 and/or of the transmission 8 attempts to retain a reference speed vRef.

Figure 2:
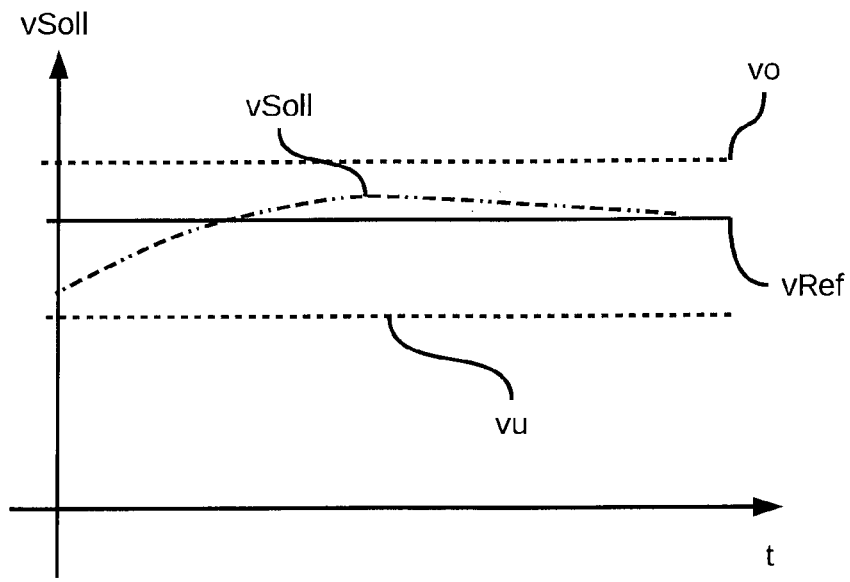
FIG. 2 shows an exemplary speed profile.

The reference speed vRef in this connection is preset by the driver. Additionally, an upper limiting speed vo and a lower limiting speed vu are preset. The adaptive control of the vehicle speed vFzg in the control unit 2 then presets, for the purpose of adapting the vehicle speed vFzg to the reference speed vRef, a set vehicle speed vSoll, which lies between the upper limiting speed vo and the lower limiting speed vu, and/or a set vehicle retardation zSoll. The computation of the set vehicle speed vSoll and/or of the set vehicle retardation zSoll is effected in this connection adaptively—that is to say, according to an embodiment of the invention the set vehicle speed vSoll is set within the upper limiting speed vo and the lower limiting speed vu in such a manner that for a route segment D situated ahead a fuel consumption that is as low as possible can be obtained. That is to say, the reference speed vRef is not of necessity set immediately by way of set vehicle speed vSoll, but rather a set vehicle speed vSoll within the speed limits vo, vu is chosen which, where appropriate, taking the set vehicle retardation zSoll into consideration, approaches the preset reference speed vRef as far as possible in fuel-saving manner. An exemplary progression of the speeds vu, vo, vRef, vSoll in this connection is specified in FIG. 2 as a function over a time t.

The computation of the set vehicle speed vSoll and also of the set vehicle retardation zSoll is effected, according to the represented embodiment, as follows:

The control unit 2 communicates by way of vehicle parameters, in particular, the current position P of the vehicle 100, the current vehicle speed vFzg, the current vehicle mass M of the vehicle 100, the maximally available drive torque A and also the maximally available braking torque B wirelessly, for instance by means of a mobile-radio link, to an external arithmetic unit 10 via a cloud signal SCloud. In particular, the current driving-dynamics situation of the vehicle 100—that is to say, how quickly the vehicle 100 having the vehicle mass M can be decelerated or accelerated from the current vehicle speed vFzg—can be characterized by the vehicle parameters vFzg, A, B, M, P.

The external arithmetic unit 10 operates in this connection in accordance with the principle of cloud computing—that is to say, the control unit 2 sends all the driving-dynamics vehicle parameters vFzg, A, B, M, P of the vehicle 100 that it itself can currently determine and that are needed for a computation of the set vehicle speed vSoll and/or of the set vehicle retardation zSoll to the external arithmetic unit 10 wirelessly, for instance by means of a mobile-radio link or such like via a network N, for instance the Internet. Said arithmetic unit can carry out, in the infrastructure thereof, extensive and complex arithmetical operations and can communicate the result of these arithmetical operations back to the control unit 2 wirelessly via the network N. In the control unit 2 only simple arithmetical operations are carried out, if at all, in order to obtain the set vehicle speed vSoll and/or the set vehicle retardation zSoll, or the result is used directly for activating the brakes 6 and/or the engine 7 and/or the transmission 8.

According to this exemplary embodiment, on the basis of the currently existing vehicle parameters P, vFzg, M, A, B the external arithmetic unit 10 communicates computation coefficients W, X, Y, Z to the control unit 2, said computation coefficients W, X, Y, Z being crucial for a computation of the set vehicle speed vSoll which is to be adjusted, in which connection according to this version it holds, for instance, that:

$$vSoll = W \cdot B + X \cdot M + Y \cdot A + Z$$

In this case, a first computation coefficient W weights the maximally available braking torque B, a second computation coefficient X weights the current vehicle mass M of the vehicle 100, and a third computation coefficient Y weights the maximally available drive torque A. In the case of a speed limit 14, a fourth computation coefficient Z corresponds equally to the value of the speed limit 14. In the case where a speed limit 14 is present, the upper limiting speed vo can be lowered to the value of the speed limit 14, so that for the set vehicle speed vSoll only values are permitted that are less than the upper limiting speed vo. At the same time, a proportional lowering of the lower limiting speed vu can also take place, so that a fuel-saving closed-loop control within the limiting speeds vu, vo is made possible. Alternatively, the first, second and/or third computation coefficient W, X, Y may also be set to zero, so that, at least within the speed limit, the vehicle speed vFzg is kept at the value of the speed limit 14.

The computation coefficients W, X, Y, Z in this connection have been stored, for instance in the external arithmetic unit 10 in a map system 15, for each position P of the vehicle 100 and for the corresponding vehicle parameters vFzg, M, A, B. The computation coefficients W, X, Y, Z for each position P can be provided to the map system 15 by an algorithm 16 that can be executed in the external arithmetic unit 10. The algorithm 16 derives the computation coefficients W, X, Y, Z from route information I in the route segment D situated ahead of the vehicle 100, which has been stored in the map system 15. To this end, fuel consumptions for differing computation coefficients W, X, Y, Z and fixed vehicle parameters vFzg, A, B, M, P are simulated in the external control unit 10 by the algorithm 16, and then the computation coefficients W, X, Y, Z for the least fuel consumption for this position P are stored. Alternatively, the external arithmetic unit 10 can also draw upon empirical values, by the algorithm monitoring the fuel consumption of vehicles 100 that were already traveling at this position P, and filtering out an optimal fuel consumption from the fuel consumption thereof. From the set vehicle speed vSoll of this vehicle 100, the computation coefficients W, X, Y, Z can then be determined and stored for this position P.

If an arbitrary vehicle 100 communicates vehicle parameters vFzg, A, B, M, P to the external arithmetic unit 10 via the cloud signal SCloud, said arithmetic unit can then send back the computation coefficients W, X, Y, Z correspondingly stored for the position P to the control unit 2 of the speed-control system 200. The control unit 2 can then compute the set vehicle speed vSoll on the basis of the computation coefficients W, X, Y, Z in accordance with the above formula without great computation effort, and correspondingly give rise to an engine demand, braking demand and/or transmission demand.

Figure 3A:
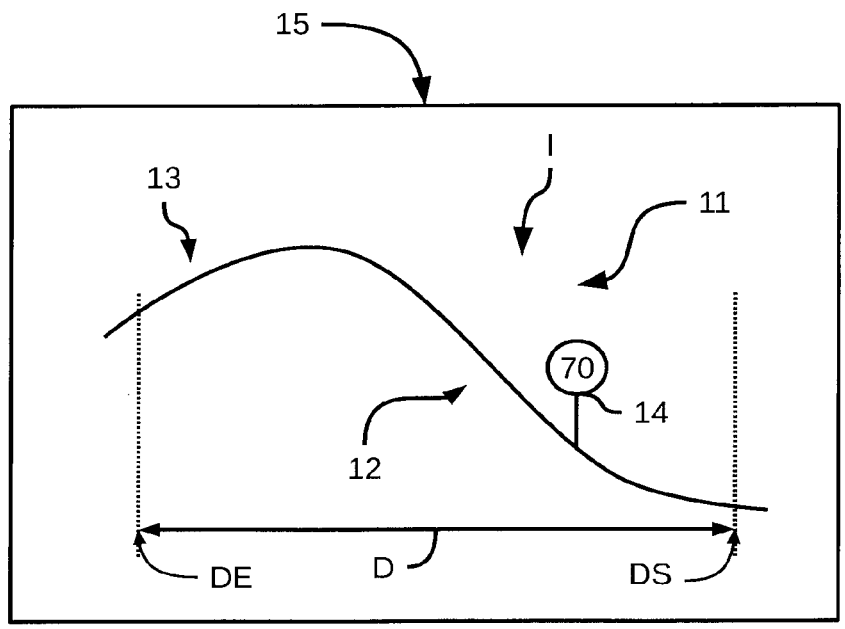
FIGS. 3a, b show exemplary route segments.
Figure 3B:
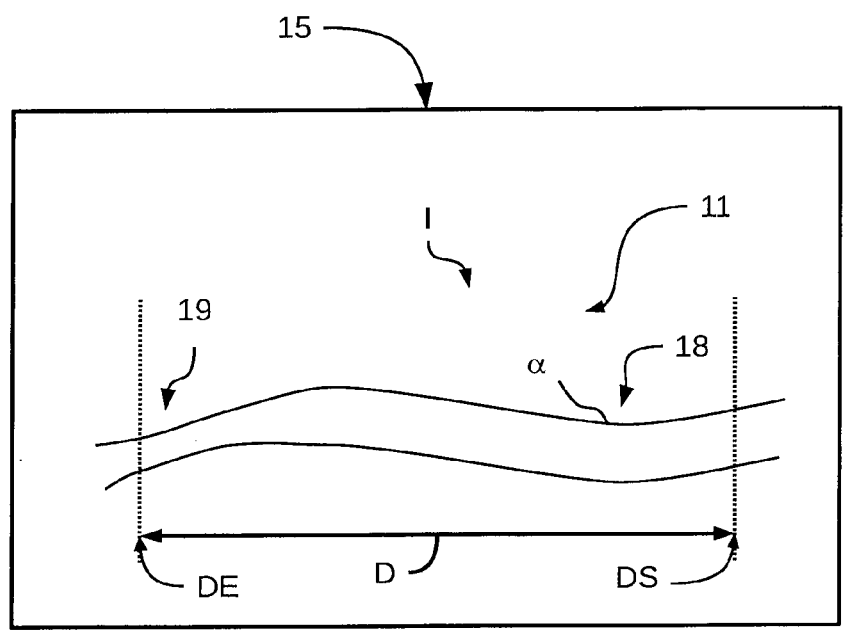
Figure 4:
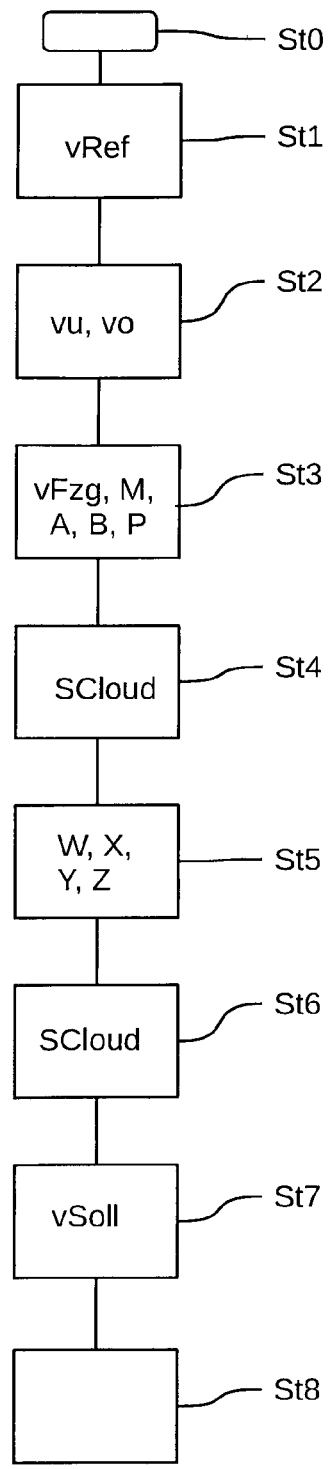
FIG. 4 shows a flow chart for carrying out a method.

By way of route information I in this connection, a topography 11—that is to say, for instance an uphill grade 12, a downhill grade 13, curves 18 with a curve radius □ or route bottlenecks 19—but also speed limits 14, traffic information 20 or similar are taken into consideration. The speed limits 14 and also the traffic information 20 can be kept at the most up-to-date state in the external arithmetic unit 10 with the aid of arbitrary Internet information services 17, so that in the course of the computation of the set vehicle speed vSoll it is possible, for instance, to react immediately to the traffic information 20. The topography 11 can be acquired by the external arithmetic unit 10 from the map system 15 in which the course of the route with altitude profiles has been stored. From the position P, for the route segment D situated ahead the topography 11 can then be ascertained from the map system 15, in which connection the topography 11 in the map system 15 can always be kept up to date. By way of example, such a course of the route with a route segment D is represented in FIGS. 3a and 3b, wherein FIG. 3a shows a side view which represents a difference in altitude, and FIG. 3b shows a top view with a curve 18 and with a route bottleneck 19.

Moreover, the upper limiting speed vo and also the lower limiting speed vu can also be communicated to the external arithmetic unit 10, so that these can be taken into consideration in the course of ascertaining the computation coefficients W, X, Y, Z for a fuel-saving mode of driving.

With the aid of the current position P the external control unit 10, or the algorithm 16, can, for instance, additionally take into consideration how far away the speed limit 14 still is, and can consequently lower the computation coefficients W, X, Y slowly to zero, in particular as a function of the topography 11, for instance an uphill grade 12 or a downhill grade 13, until the speed limit 14 commences, so that a change in the vehicle speed vFzg can virtually be set as a function of how quickly, or from when, an event in the course of the route is to be taken into consideration, in order not to give rise to an abrupt deceleration or start-up, and consequently to save fuel.

Accordingly, the weighting of the maximally available drive torque A, or the third computation coefficient Y, can already be set to zero earlier in the case of a downhill grade 13 than in the case of an uphill grade 12, since in the case of a downhill grade 13 the maximally available drive torque A is irrelevant. The maximally available braking torque B, or the first computation coefficient W, is not relevant in the case of an uphill grade 12, but is relevant in the case of a downhill grade 13. The vehicle mass M, on the other hand, is relevant, both in the case of an uphill grade 12 and in the case of a downhill grade 13, for a fuel-saving accelerating and decelerating, so the second computation coefficient X is greater than zero until the speed limit 14 has been attained.

In the course of ascertaining the computation coefficients W, X, Y, Z the algorithm 16 also takes into consideration, for instance, the fact that, starting from its current vehicle speed vFzg with its maximally available drive torque A, the vehicle 100 will overcome an uphill grade 12 situated ahead or a downhill grade 13 with a minimal fuel consumption when a set vehicle speed vSoll is adjusted that lies between the upper limiting speed vo and the lower limiting speed vu, in which connection it is taken into consideration how long the uphill grade 12 situated ahead or the downhill grade 13 is, and whether a downhill grade 13 follows the uphill grade 12 situated ahead or whether an uphill grade 12 follows the downhill grade 13. For instance, the set vehicle speed vSoll can be lowered to the lower limiting speed vu shortly before a crest of the uphill grade, in which connection it is taken into consideration that after the crest a downhill grade 13 follows, by virtue of which the vehicle 100 can be accelerated to the reference speed vRef without an activation of the engine. This holds analogously tor the activation of the brakes in the course of a transition from a downhill grade 13 to an uphill grade 12 or a plateau in which the vehicle 100 can be decelerated from the upper limiting speed vo to the reference speed vRef by coasting, without an activation of the brakes taking place.

The upper limiting speed vo can in this connection be established, for instance, as a function of a maximum speed vmax of the vehicle 100 or alternatively as a function of a possibly existing speed limit 14 for the route segment D situated ahead. The lower limiting speed vu may have been established by the driver and may take into consideration how quickly the vehicle 100 is to reach its destination. Moreover, the lower limiting speed vu can be established on the basis of the vehicle parameters for the drive torque or braking torque or on the basis of the vehicle mass A, B, M, or as a function of the upper limiting speed vo set by the driver.

The route segment D situated ahead, which is considered by the algorithm 16 in order to determine the computation coefficients W, X, Y, Z, is, according to one embodiment, dependent on a currently existing kinetic energy $Ekin = M \cdot vFzg^2$ in the vehicle 100—that is to say, on the current vehicle mass M and on the current vehicle speed vFzg. If a vehicle 100 having a high vehicle mass M and a high vehicle speed vFzg is present, more kinetic energy Ekin is present in the vehicle 100, so that, for instance, for a braking procedure a traveled (braking) distance is also longer. Consequently, in the case of a vehicle 100 having high kinetic energy Ekin a longer route segment D also has to be considered, within which a reaction to the topography 11, to an item of traffic information 20 or to a speed limit 14 needs to occur by an activation of the brakes or an activation of the engine. In the case of a vehicle 100 having a lower vehicle mass M and a low vehicle speed vFzg, a reaction can occur more quickly, so the route segment D can be chosen to be shorter.

The route segment D in this connection is established by a route-segment start-point DS and a route-segment end-point DE, which likewise are both dependent on the kinetic energy Ekin and also on the driving-dynamics vehicle parameters vFzg, A, B, M, P. Depending upon the topography 11 at the current position P of the vehicle 100, the route-segment start-point DS is dependent on a responsivity of the vehicle 100. If the vehicle 100 has a higher maximally available drive torque A or a higher maximally available braking torque B, then in the case of an uphill grade 12 or in the case of a downhill grade 13 it can react more quickly to a possible change in the set vehicle retardation vSoll. Consequently, in the course of the computation of the set vehicle speed vSoll, or for the computation coefficients W, X, Y, Z, route information I is relevant that is situated closer to the vehicle 100 than in the case of a vehicle 100 that, by reason of a lower maximally available drive torque A or maximally available braking torque B, is able to bring a correspondingly directed acceleration onto the road only at a later time.

The same applies to the route-segment end-point, which, as a function of the kinetic energy Ekin or as a function of the vehicle mass M and the current vehicle speed vFzg, is situated closer to the vehicle 100 or is further away. In this case this is, in particular, likewise dependent on the maximally available drive torque A or on the maximally available drive torque B, which establish how strongly the vehicle 100 with its kinetic energy Ekin can be accelerated or decelerated.

Accordingly, merely route information I in the route course D situated ahead is made available to the algorithm 16 in the external arithmetic unit 10, which ascertains the computation coefficients W, X, Y, Z, since this information suffices for determining a fuel-saving set vehicle speed vSoll. As a result, the computation time and the computation effort and also the amount of data in the external arithmetic unit 10 can be optimized, and the signal length to be transmitted of the cloud signal SCloud can be reduced. By virtue of the fact that both the vehicle speed vFzg and the vehicle mass M are continually transmitted in up-to-date manner to the external arithmetic unit 10 via the cloud signal SCloud, the route segment D situated ahead can be continually updated in the external arithmetic unit 10 as a function of the kinetic energy Ekin, and provided to the algorithm 16.

Analogously, the set vehicle retardation zSoll can also be determined from the computation coefficients W, X, Y, Z in the control unit 2, in which case, for instance, the maximally available braking torque B, the maximally available drive torque A, the vehicle mass M and also route information I—for instance, uphill grades 12 and downhill grades 13—are likewise correspondingly weighted in order to obtain a set vehicle retardation zSoll.

The method for adaptively controlling a vehicle speed vFzg can, for instance, be carried out in the following manner:

In an initial step St0, the speed-control system 200 is started up, for instance by actuation of an appropriate switch by the driver. In a first step St1, the vehicle reference speed vRef is established, preferentially by the driver. Optionally, in a second step St2 an upper speed limit vo and a lower speed limit vu can be established.

In a third step St3, driving-dynamics vehicle parameters vFzg, M, A, B, P are determined which currently obtain in the vehicle 100 and which can be made available by corresponding devices 3, 4, 5, AS, BS in the vehicle 100. These parameters are communicated to an external arithmetic unit 10 in a fourth step St4 via a cloud signal SCloud in the network N.

Said arithmetic unit ascertains, in a fifth step St5, computation coefficients W, X, Y, Z, these being provided by the algorithm 16, said algorithm 16 ascertaining, for instance by means of simulations or on the basis of empirical values, computation coefficients W, X, Y, Z, and storing them for several positions P in the map system 15. If vehicle parameters vFzg, M, A, B, P are communicated to the external arithmetic unit 10 via the cloud signal SCloud, the stored computation coefficients W, X, Y, Z for the corresponding position P of the vehicle 100 are retrieved and provided for the purpose of communication. In a sixth step St6, the computation coefficients W, X, Y, Z are communicated via the cloud signal SCloud, for instance by means of a mobile radio signal or such like, to the control unit 2 in which, in a seventh step St7, the set vehicle speed vSoll and/or the set vehicle retardation zSoll is/are computed. Alternatively, the seventh step St7 may also already be carried out in the external arithmetic unit 10, so that the set vehicle speed vSoll and/or the set vehicle retardation zSoll is/are already communicated via the cloud signal SCloud.

In the last step St8, the brakes 6 and/or the engine 7 and/or the transmission 8 of the vehicle 100 is/are activated by the speed-control system 200, in order to set the set vehicle speed vSoll, where appropriate, with the corresponding set vehicle retardation zSoll and consequently to approximate the current vehicle speed vFzg in fuel-saving manner to the vehicle reference speed vRef which has been preset by the driver.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS 1 wheels of the vehicle 1
2 control unit
3 position-determining system
4 mass-determining system
5 wheel-speed sensors
6 brakes
7 engine
8 transmission
10 external arithmetic unit
11 topography
12 uphill grade
13 downhill grade
14 speed limit
15 map system
16 algorithm
17 Internet information service
18 curves
19 route bottleneck
20 traffic information
21 surround-field sensor
100 vehicle
200 speed-control system
α curve radius A maximally available drive torque
AS drive control unit
B maximally available braking torque
BS brake control unit
D route segment situated ahead
DE route-segment start-point
DS route-segment end-point
Ekin kinetic energy
GS transmission controller
I route information
M vehicle mass
P position
SCloud cloud signal
SU signal of the surround-field sensor
t time
vFzg vehicle speed
vmax maximum speed
vo upper limiting speed
vRef reference speed
vSoll set vehicle speed
vu lower limiting speed
W first computation coefficient
X second computation coefficient
Y third computation coefficient
Z fourth computation coefficient
zSoll set vehicle retardation
St0, St1, St2, St3, St4, St5, St6, St7, St8 steps of the method

The invention claimed is:

1. A method for adaptively controlling a vehicle speed in a vehicle, the method comprising:
   establishing a reference speed; and
   activating an engine and/or brakes and/or a transmission of the vehicle by a speed-control system as a function of a set vehicle speed and/or a set vehicle retardation for fuel-saving adaptation of the currently existing vehicle speed to the reference speed;
   wherein the set vehicle speed and/or the set vehicle retardation for a current driving-dynamics situation of the vehicle defined by driving-dynamics vehicle parameters is/are determined as a function of at least one computation coefficient,
   wherein the at least one computation coefficient is provided by an external computer outside the vehicle as a function of the currently existing driving-dynamics vehicle parameters and also as a function of currently existing route information for a route segment situated ahead, and
   wherein the route segment situated ahead is established on the basis of the currently existing driving-dynamics vehicle parameters.

2. The method as claimed in claim 1, wherein an algorithm in the external computer derives the at least one computation coefficient as a function of the currently existing route information and as a function of a position of the vehicle, wherein the algorithm for computing the at least one computation coefficient takes route information into consideration that is situated within the route segment situated ahead for the purpose of limiting the amount of data to be processed by the algorithm.

3. The method as claimed in claim 2, wherein the at least one computation coefficient derived by the algorithm is stored for each position in a map system containing the route information, in which connection route segments and driving-dynamics vehicle parameters have been assigned to each position.

4. The method as claimed in claim 3, wherein the route information in the map system is kept up to date, in particular via an Internet information service.

5. The method as claimed in claim 2, wherein the algorithm derives the at least one computation coefficient having the least fuel consumption for the route segment situated ahead on the basis of simulations.

6. The method as claimed in claim 1, wherein a currently existing position and a currently existing vehicle speed and/or a current vehicle mass and/or a currently maximally available drive torque and/or a currently maximally available braking torque are used by way of driving-dynamics vehicle parameters.

7. The method as claimed in claim 6, wherein the route segment situated ahead is determined as a function of the current vehicle mass and as a function of the current vehicle speed.

8. The method as claimed in claim 7, wherein a route-segment start-point and a route-segment end-point of the route segment situated ahead are determined as a function of the maximally available drive torque and/or as a function of the maximally available braking torque.

9. The method as claimed in claim 6, wherein for the purpose of computing the set vehicle speed and/or the set vehicle retardation the currently maximally available braking torque is weighted with a first computation coefficient and/or the current vehicle mass is weighted with a second computation coefficient and/or the currently maximally available drive torque is weighted with a third computation coefficient, and/or route information is taken into consideration by a fourth computation factor.

10. The method as claimed in claim 1, wherein the set vehicle speed and/or the set vehicle retardation is/are computed and/or set in a controller, in particular in the speed-control system, in the vehicle on the basis of the at least one computation coefficient ascertained by the external computer.

11. The method as claimed in claim 1, wherein the vehicle parameters are transmitted to the external computer wirelessly via a cloud signal, and the at least one computation coefficient ascertained therefrom is transmitted from the external computer to the control unit wirelessly via the cloud signal.

12. The method as claimed in claim 1, wherein the external computer is a cloud-based computer, wherein the at least one computation coefficient in the external computer can be provided for several vehicles simultaneously.

13. The method as claimed in claim 1, wherein a topography in particular, uphill grades, downhill grades, curves with a curve radius, route bottlenecks and/or speed limits and/or traffic information can be taken into consideration by way of route information.

14. The method as claimed in claim 1, wherein the set vehicle speed is set within an upper speed limiting value ($v_o$) and a lower speed limiting value.

15. A speed-control system of a vehicle, comprising:
a controller;
a satellite positioning system configured to ascertain a current position;
a mass sensor configured to ascertain a current vehicle mass,
wheel-speed sensors configured to ascertain a current speed;
a drive controller configured to activate the engine and also configured to provide the currently maximally available drive torque, and
a brake controller configured to activate the brakes and also configured to provide the currently maximally available braking torque,
wherein the controller is designed to read in driving-dynamics vehicle parameters and to communicate them to an external computer wirelessly via a cloud signal and to receive at least one computation coefficient from the external computer via the cloud signal, and
wherein the controller is further configured to determine from the at least one computation coefficient a set vehicle speed and/or a set vehicle retardation, for the purpose of activating the engine and/or the brakes and/or the transmission of the vehicle, so that the currently existing vehicle speed is adapted in fuel-saving manner to the vehicle reference speed which has been preset by the driver.

16. A vehicle, in particular a utility vehicle with a speed-control system as claimed in claim 15.

* * * * *